United States Patent [19]

Hilpert et al.

[11] 4,199,977

[45] Apr. 29, 1980

[54] INSTALLATION FOR THE CONTINUOUS MEASUREMENT OF THE FUEL CONSUMPTION OF INTERNAL COMBUSTION ENGINES

[75] Inventors: Wolfgang Hilpert, Stuttgart; Gerhard Komander, Altbach; Manfred Stotz, Aichwald, all of Fed. Rep. of Germany

[73] Assignee: Daimler-Benz Aktiengesellschaft, Fed. Rep. of Germany

[21] Appl. No.: 918,451

[22] Filed: Jun. 23, 1978

[30] Foreign Application Priority Data

Jun. 23, 1977 [DE] Fed. Rep. of Germany ....... 2728201

[51] Int. Cl.$^2$ .......................................... G01M 15/00
[52] U.S. Cl. ..................................... 73/119 A; 73/113
[58] Field of Search .............. 73/114, 113, 116, 119 A

[56] References Cited

U.S. PATENT DOCUMENTS

| | | | |
|---|---|---|---|
| 2,649,709 | 8/1953 | Sturtz | 73/114 |
| 3,014,366 | 12/1961 | Faunce | 73/114 |
| 3,069,901 | 12/1962 | Freeman et al. | 73/114 X |
| 3,412,602 | 11/1968 | Rush et al. | 73/119 A |
| 3,916,682 | 11/1975 | Garcea | 73/114 |

Primary Examiner—Jerry W. Myracle
Attorney, Agent, or Firm—Craig and Antonelli

[57] ABSTRACT

An installation for the continuous measurement of the fuel consumption of internal combustion engines, in which a fuel-metering member predetermining with its position the through-put fuel quantity as a function of displacement. A preferably electrical displacement pick-up is coupled with the fuel-metering member which produces an analog signal corresponding to the deflection of the fuel-metering member from its normal position while an instrument for the indication of the signal is arranged within the field of vision of the operating person.

11 Claims, 4 Drawing Figures

FIG 2
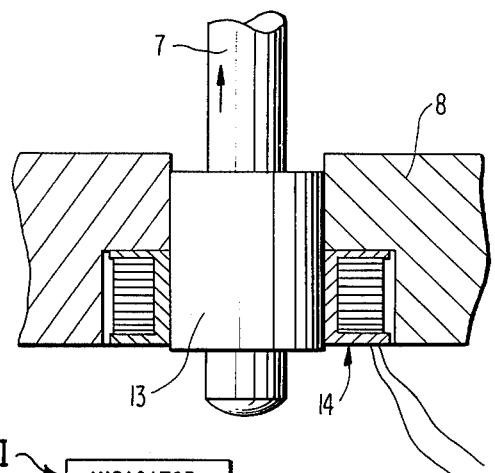
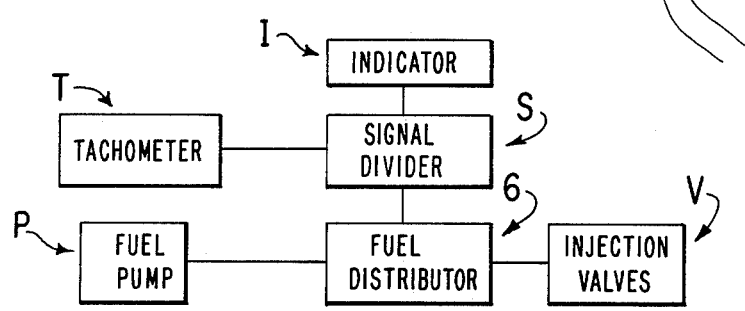
FIG 4
FIG 3
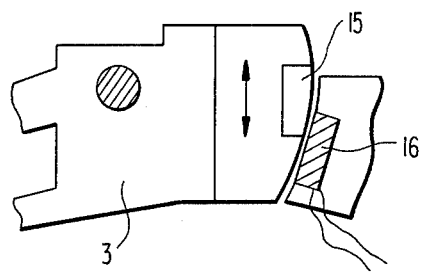

INSTALLATION FOR THE CONTINUOUS MEASUREMENT OF THE FUEL CONSUMPTION OF INTERNAL COMBUSTION ENGINES

The present invention relates to an installation for the continuous measurement of the fuel consumption of internal combustion engines with a fuel-metering member predetermining with its position the passed-through fuel quantity in dependence on travel or displacement.

In countries with exhaust gas regulations, especially in the United States, an energy-conscious operation of internal combustion engines is desired to an increased extent. The actual fuel consumption during the instantaneous operating condition is to be indicated to the operating person by an installation, in order that he can adjust or maintain above all for economic reasons, a load of the internal combustion engine favorable for this operating condition.

It is the aim of the present invention to indicate the actual instantaneous fuel consumption, especially in gasoline injection systems, by means of an installation at a given operating condition of an internal combustion engine.

The underlying problems are solved according to the present invention in that a preferably electrical displacement pick-up is coupled with a fuel-metering member which, corresponding to the deflection of the fuel-metering member from its rest position, produces an analog signal and in that an instrument is arranged within the field of vision of the operating person of the internal combustion engine for the indication of this signal.

With a mechanically acting, continuously operating gasoline injection installation, fuel flows from a system which is under constant pressure through rectangularly shaped openings into chambers also under constant pressure, from which the fuel reaches the injection nozzles. The magnitude of the through-flow cross section to the chambers is determined by the position of a fuel-metering member, for example, of a piston, whereby the released or opened-up cross section is proportional to the piston stroke.

It is advantageous to select the rectangularly shaped openings in relation to the piston stroke considerably higher than wide. As a result thereof, the piston stroke becomes relatively large which has a favorable effect on the indicating accuracy of the fuel through-put. The piston stroke can now be measured directly at the piston or at a member of the transmission linkage, such as, for example, baffle plate, baffle plate lever arm, pivot shaft, etc., according to different methods, such as, for example, by a potentiometer, inductively, opto-electronically, etc., whereby depending on the measuring system, corresponding correcting factors have to be taken into consideration.

The measurement of the fuel consumption is considerably simplified by the installation according to the present invention and any falsification of the measurement results by leakage losses, etc. is precluded because the measurement takes place in the line to the injection nozzles.

For vehicles with a tachometer, the signal of the installation may finally be divided by a signal proportional to the tachometer indication.

The fuel consumption is reproduced in liters/100 km., respectively, in km/liter by this interconnection.

Accordingly, it is an object of the present invention to provide an installation for the continuous measurement of the fuel consumption of internal combustion engines which avoids by simple means the aforementioned shortcomings and drawbacks encountered in the prior art.

Another object of the present invention resides in an installation for the continuous measurement of the fuel consumption of internal combustion engines which permits to the driver by extremely simple means to maintain or adjust a load of the internal combustion engine favorable for an economic operating condition thereof.

A further object of the present invention resides in an installation operable to indicate the actual fuel consumption at the instantaneous given operating condition in an accurate yet simple manner.

A still further object of the present invention resides in an installation for the continuous measurement of the fuel consumption of internal combustion engines which is characterized by high indicating accuracy, yet excels by its great simplicity, precluding any falsification of the measurement results due to leakage losses or the like.

These and other objects, features and advantages of the present invention will become more apparent from the following description when taken in connection with the accompanying drawing which shows, for purposes of illustration only, several embodiments in accordance with the present invention, and wherein:

FIG. 2 is a somewhat schematic partial cross-sectional view of an arrangement for the inductive measurement of the piston stroke in accordance with the present invention;

FIG. 3 is a somewhat schematic partial plan view on an arrangement for the measurement of the piston stroke according to the present invention by interposition of a pivot shaft by means of a permanent magnet and of a Hall generator; and FIG. 4 is a block diagram of the injection installation in accordance with the present invention.

Figure 1:
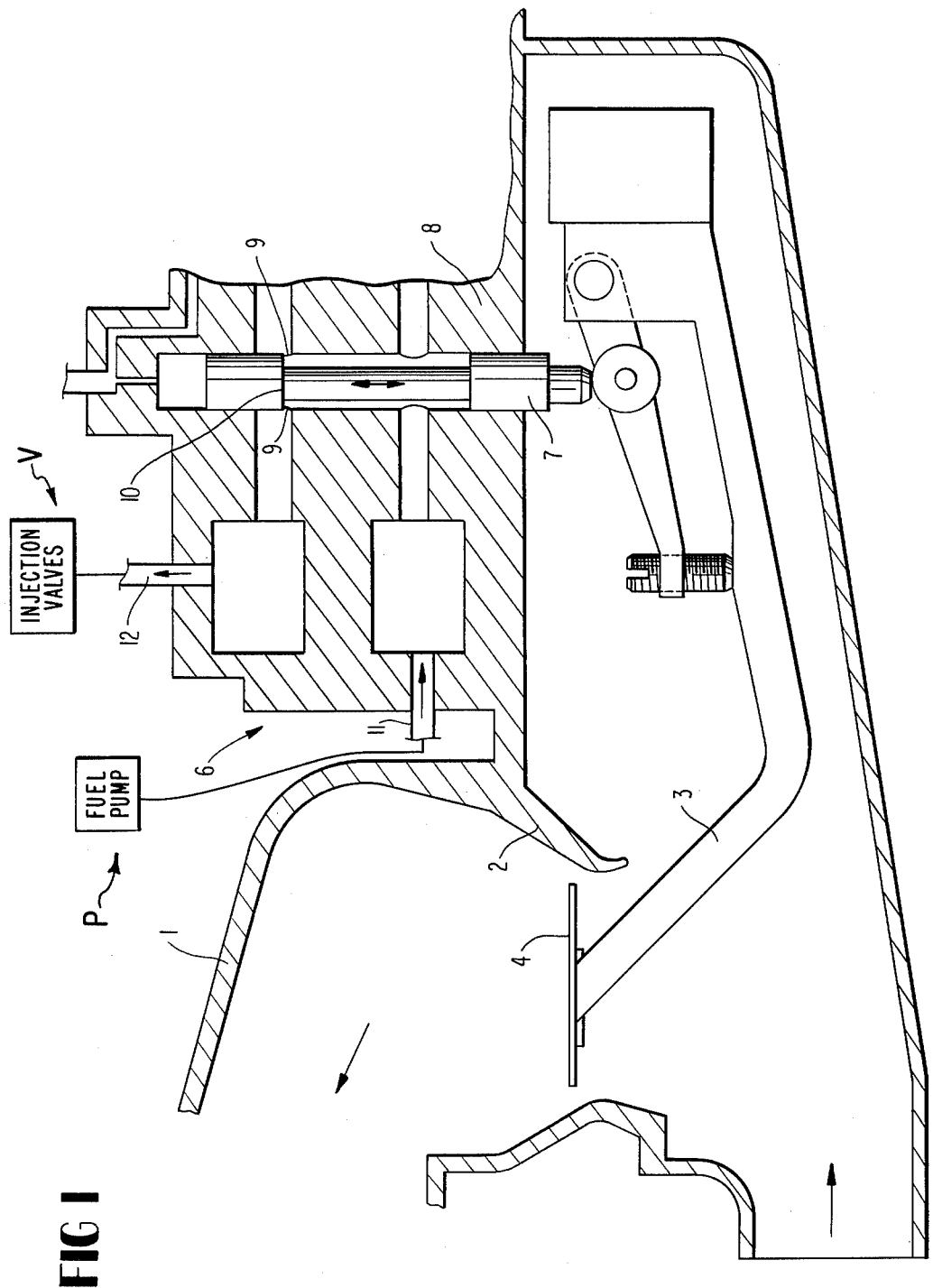
FIG. 1 is a somewhat schematic partial cross-sectional view through a gasoline injection installation with a piston controlling the fuel through-put.

Referring now to the drawing wherein like reference numerals are used throughout the various views to designate like parts, the cross section of a gasoline injection installation illustrated in FIG. 1 consists of an air diffusor or venturi tube 2 arranged in the suction pipe 1 and of a baffle plate 4 supported on a lever 3. The baffle plate 4 arranged according to the principle of a floating body is deflected corresponding to the suction air quantity. A control piston or fuel-measuring member 7 and a slot carrier 8 are arranged centrally within the fuel quantity distributor generally designated by reference numeral 6. Rectangular slots or control throttles 9 are machined into the slot carrier 8 with the degree of opening of the slots 9 being governed by a horizontal control edge 10 of the control piston 7. The opening cross section of the control throttles 9 is dependent on the deflection of the baffle disk 4 which is transmitted by way of the lever 3 onto the control piston 7.

The fuel supplied by a fuel pump generally designated by the reference character P by way of a fuel reservoir and a fuel filter, enters into the fuel quantity distributor 6 through a feed line 11, and flows through the opening cross section released or opened up by the control edge 10 into the rectangular slots 9 and through a line 12 to the injection valves generally designated by the reference character V.

The fuel through-put can be determined by the displacement, respectively, by the position of the control piston 7 which, as illustrated in FIG. 2, consists at one end of a ferro-magnetic material, whereby the end 13 more or less immerses into a coil generally designated by the reference numeral 14. The immersion depth is evaluated as measurement for the position of the control piston 7, respectively, as measurement for the fuel through-put through the fuel quantity distributor 6 by electronic means of any known type and therefore not described herein in detail.

The displacement of the control piston 7 can also be measured by the rotation of the lever 3 in the same manner as in FIG. 2, or the lever 3 can also be provided with a permanent magnet 15, which cooperates with a fixed Hall generator 16 which is operatively connected with a corresponding electronic system. Since the rotary angle is not proportional to the piston stroke, a correcting factor has to be taken into consideration with such an arrangement.

The end 13 of the control piston 7 may also be equipped with a permanent magnet which cooperates with a Hall generator.

As shown in FIG. 4, if a tachometer generally designated by the reference character T is provided, the signal corresponding to a deflection of the control piston or fuel measuring member of the fuel quantity distributor may be divided by a suitable signal divider generally designated by the reference character S, constructed in a conventional manner.

Of course, still other measuring methods can be utilized for the measurement of the piston stroke insofar as this is of advantage.

By the interconnection of the fuel through-put with the vehicle velocity, the instantaneous fuel consumption, for example, in liters/100 km, respectively, km/liter, is determined, which is indicated by a corresponding indicator or instrument generally designated by the reference character I (FIG. 4) within the field of vision of the operating person.

While we have shown and described only two embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An installation for a continuous measurement of fuel consumption of internal combustion engines provided with fuel injection nozzles, the installation comprising a fuel-metering means for determining a quantity of fuel passed through the installation as a function of displacement thereof from a normal position, characterized in that a displacement pick-up means is operatively connected with the fuel metering means, the pick-up means includes a piston for controlling the amount of fuel flowing to the injection nozzles through a fuel distributor means and for producing an analog signal corresponding to a deflection of the fuel-metering means from the normal position, and in that an instrument means is operatively connected with the pick-up means for providing an indication of the fuel consumption in response to the signal produced by the pick-up means, said instrument means is arranged within a field of vision of an operator of the internal combustion engine.

2. An installation for a continuous measurement of fuel consumption of internal combustion engines provided with fuel injection nozzles, the installation comprising a fuel-metering means for determining a quantity of fuel passed through the installation as a function of a displacement thereof from a normal position, characterized in that a displacement pick-up means is operatively connected with the fuel metering means, the pick-up means includes a piston for controlling an amount of fuel flowing to the injection nozzles through a fuel distributor means and for producing a signal corresponding to a deflection of the fuel metering means from the normal position, and in that an instrument means is operatively connected with the pick-up means for providing an indication of the fuel consumption response to the signal produced by the pick-up means, said instrument means is arranged within a field of vision of an operator of the internal combustion engine.

3. An installation according to one of claims 1 or 2, characterized in that the pick-up means further includes an electrical means operatively connected with the piston for generating an electrical signal in response to the deflection of the fuel metering means.

4. An installation according to claim 3, characterized in that the electrical means includes ferro-magnetic material provided on a portion of the piston and cooperable with a coil means whereby an immersion depth of the ferro-magnetic material is indicative of a measurement for the fuel quantity flowing to the injection nozzles.

5. An installation according to claim 3, characterized in that said electrical means includes a permanent magnet means operatively connected with the piston and cooperable with a relatively fixed Hall generator means operatively connected with an electronic evaluating means.

6. An installation according to one of claims 1 or 2, characterized in that the internal combustion engine further includes a suction pipe having an air diffuser means, a baffle plate means is arranged in an area of the diffuser means, the baffle plate means is adapted to be deflected in accordance with a quantity of intake air being drawn into the suction pipe, and in that means are provided for operatively connecting said baffle plate means with said piston such that said piston is displaceable by a deflection of the baffle plate means.

7. An installation according to claim 6, characterized in that a fuel distributor means is arranged between a fuel pump means and the injection nozzles for distributing fuel to the injection nozzles, the fuel distributor means includes at least one control throttle means controllable by said piston.

8. An installation according to claim 7, characterized in that the pick-up means further includes an electrical means operatively connected with the piston for generating an electrical signal in response to the deflection of the fuel metering means.

9. An installation according to claim 8, characterized in that the signal produced by the pick-up means corresponding to a deflection of the fuel-metering means from the normal position is an analog signal.

10. An installation according to claim 9, characterized in that the electrical means includes ferro-magnetic material provided on a portion of the piston and cooperable with a coil means whereby an immersion depth of the ferro-magnetic material is indicative of a measurement for the fuel quantity flowing to the injection nozzles.

11. An installation according to claim 9, characterized in that said electrical means includes a permanent magnet means operatively connected with the piston and cooperable with a relatively fixed Hall generator means operatively connected with an electronic evaluating means.

* * * * *